(12) United States Patent
Chang et al.

(10) Patent No.: US 12,257,726 B2
(45) Date of Patent: Mar. 25, 2025

(54) ROBOT AND ROBOT HAND-EYE CALIBRATING METHOD

(71) Applicant: NATIONAL TSING HUA UNIVERSITY, Hsinchu (TW)

(72) Inventors: Jen-Yuan Chang, Hsinchu County (TW); Chun-Tse Lee, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 220 days.

(21) Appl. No.: 18/048,862

(22) Filed: Oct. 24, 2022

(65) Prior Publication Data

US 2024/0001557 A1 Jan. 4, 2024

(30) Foreign Application Priority Data

Jun. 30, 2022 (TW) .................................. 111124615

(51) Int. Cl.
*B25J 9/16* (2006.01)

(52) U.S. Cl.
CPC .......... *B25J 9/1692* (2013.01); *B25J 9/1653* (2013.01); *B25J 9/1664* (2013.01); *B25J 9/1697* (2013.01)

(58) Field of Classification Search
CPC ...... B25J 9/1697; B25J 9/1653; B25J 9/1664; B25J 9/1692; G05B 2219/39008; G05B 2219/40264; G05B 2219/39057
See application file for complete search history.

(56) References Cited

U.S. PATENT DOCUMENTS

| 10,471,591 | B1* | 11/2019 | Hinkle | B25J 9/1612 |
| 2003/0144765 | A1* | 7/2003 | Habibi | G06T 1/0007 |
| | | | | 700/259 |
| 2018/0194008 | A1* | 7/2018 | Namiki | G06T 7/80 |
| 2020/0122332 | A1* | 4/2020 | Harada | B25J 9/1635 |
| 2020/0230818 | A1* | 7/2020 | Lee | B25J 9/161 |
| 2020/0324414 | A1* | 10/2020 | Islam | B25J 9/1692 |

FOREIGN PATENT DOCUMENTS

| CN | 103209809 A | 7/2013 |
| CN | 104511900 A | 4/2015 |
| CN | 112975973 A | 6/2021 |

* cited by examiner

*Primary Examiner* — Stephen Holwerda
(74) *Attorney, Agent, or Firm* — CKC & Partners Co., LLC

(57) ABSTRACT

A robot for interacting with a target object includes a robotic manipulator, a calibrating image, a camera and a processor. The robotic manipulator corresponds to a robotic manipulator coordinate. The calibrating image is disposed on the robotic manipulator. The camera corresponds to a camera coordinate and for shooting the target object and generating a picture. The processor is configured to move the robotic manipulator such that the calibrating image moves towards the target object and enters the picture. The processor records robotic manipulator coordinate datasets and camera coordinate datasets of the calibrating image as the calibrating image moving towards the target object, and uses the robotic manipulator coordinate datasets and the camera coordinate datasets to execute a hand-eye calibrating algorithm to obtain a calibrated mapping between the camera coordinate and the robotic manipulator coordinate.

9 Claims, 6 Drawing Sheets

ROBOT AND ROBOT HAND-EYE CALIBRATING METHOD

RELATED APPLICATIONS

This application claims priority to Taiwan Application Serial Number 111124615, filed Jun. 30, 2022, which is herein incorporated by reference.

BACKGROUND

Technical Field

The present disclosure relates to a robot and a robot hand-eye calibrating method. More particularly, the present disclosure relates to a robot with a camera and a robot hand-eye calibrating method.

Description of Related Art

With the development of the industry, robots are not restricted to apply for the repeatable tasks any more, but need to be adjusted and calibrated for the variability of tasks, and thus a robotic manipulator integrated with an optical-visual system is developed. When the robotic manipulator is integrated with the optical-visual system, the technology of hand-eye calibration is required to calculate a mapping between the coordinates of the robotic manipulator and the optical-visual system such that the robotic manipulator can move to the position detected by the optical-visual system precisely.

In the conventional art of the hand-eye calibration, the procedure of the hand-eye calibration and the procedure of operating the robotic manipulator are executed individually. Before the task begins, a calibration plate is disposed in a working space manually, the robotic manipulator is driven to move in various postures as the camera shoots pictures, and then the algorithm of the mapping between the camera coordinate and the robotic manipulator coordinate is calculated. The task begins until calibration is finished. However, when the variability of the task is increased, the robot usually needs to execute hand-eye calibration and stop working frequently; as a result, the working efficiency is decreased; on the other hands, if there is no space for placing the calibration plate in the working space or the environment is dusted, the hand-eye calibration by placing the calibration plate is not applicable. Moreover, in the conventional art of the hand-eye calibration, the various postures of moving the robotic manipulator are tested manually, and the testing procedure takes a lot of time.

With the improvement of the technology of the robot, the robot system is developed as a complicated system with multi-hands, and the camera does not stand still any more to increase the visible range of the camera for the expanded working space of the robot so that the mapping between the robotic manipulator coordinate and the camera coordinate is required to be calibrated more often. Hence, how to shorten the required time of the hand-eye calibration and improve the immediacy of the hand-eye calibration is a target that those in the related field pursue.

SUMMARY

According to one aspect of the present disclosure, a robot for interacting with a target object includes a robotic manipulator, a calibrating image, a camera and a processor. The robotic manipulator corresponds to a robotic manipulator coordinate. The calibrating image is disposed on the robotic manipulator. The camera corresponds to a camera coordinate and for shooting the target object and generating a picture. The processor is configured to move the robotic manipulator such that the calibrating image moves towards the target object and enters the picture, and the processor records robotic manipulator coordinate datasets and camera coordinate datasets of the calibrating image as the calibrating image moving towards the target object, and uses the robotic manipulator coordinate datasets and the camera coordinate datasets to execute a hand-eye calibrating algorithm to obtain a calibrated mapping between the camera coordinate and the robotic manipulator coordinate.

According to another aspect of the present disclosure, a robot hand-eye calibrating method includes a camera rotating step, a robotic manipulator moving step, a datasets recording step and a hand-eye calibrating step. The camera rotating step is performed to rotate a camera such that the target object enters a picture of the camera, wherein the camera corresponds to a camera coordinate. The robotic manipulator moving step is performed to move a robotic manipulator such that a calibrating image on the robotic manipulator moves towards a target object, wherein the robotic manipulator corresponds to a robotic manipulator coordinate. In the datasets recording step, a processor records robotic manipulator coordinate datasets and camera coordinate datasets of the calibrating image as the calibrating image moving towards the target object. In the hand-eye calibrating step, the processor uses the robotic manipulator coordinate datasets and camera coordinate datasets to execute a hand-eye calibrating algorithm to obtain a calibrated mapping between the camera coordinate and the robotic manipulator coordinate.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
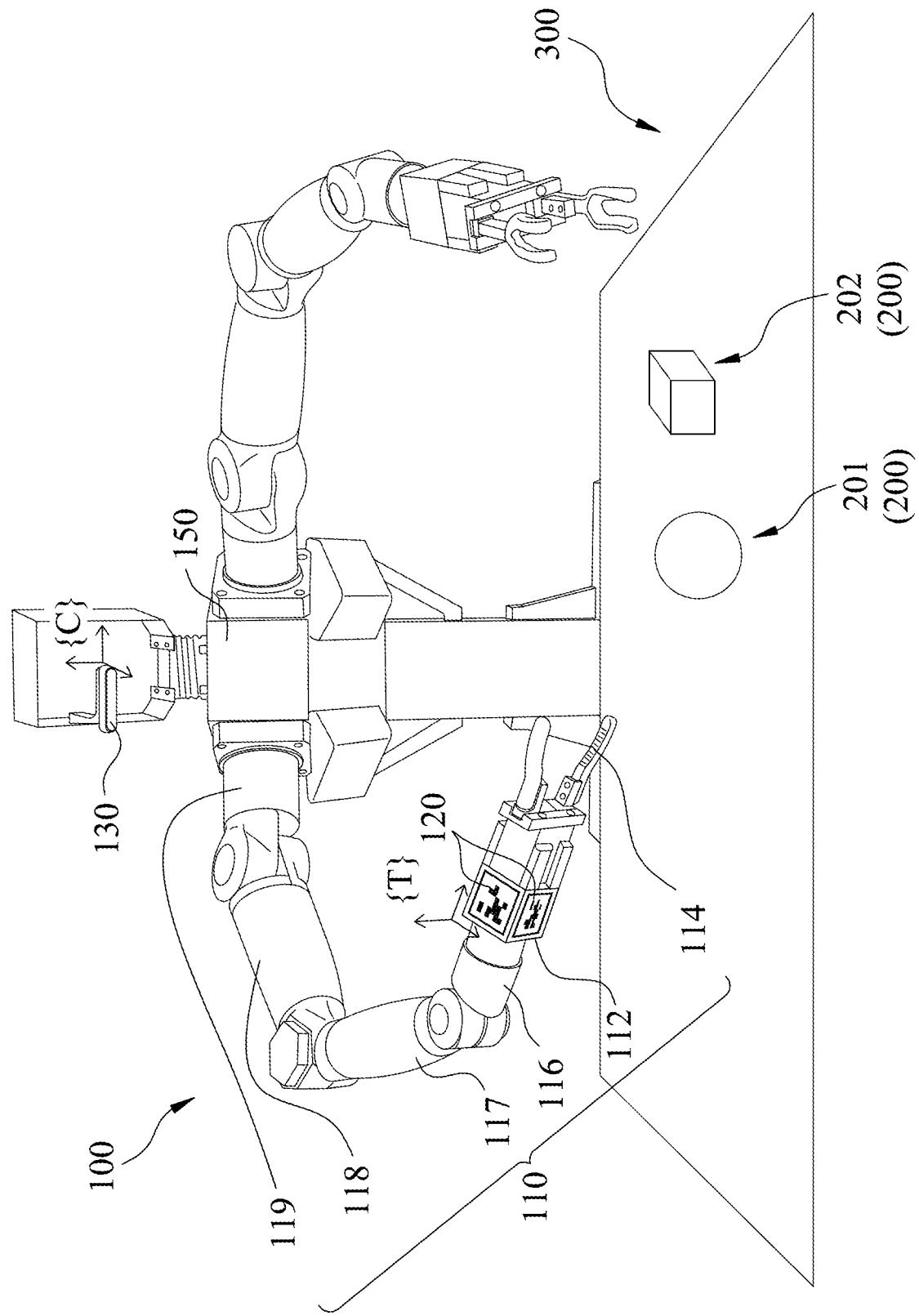
FIG. 1 shows a three-dimensional view of a robot according to an embodiment of the present disclosure and a schematic view of a working space and a target object.
Figure 2:
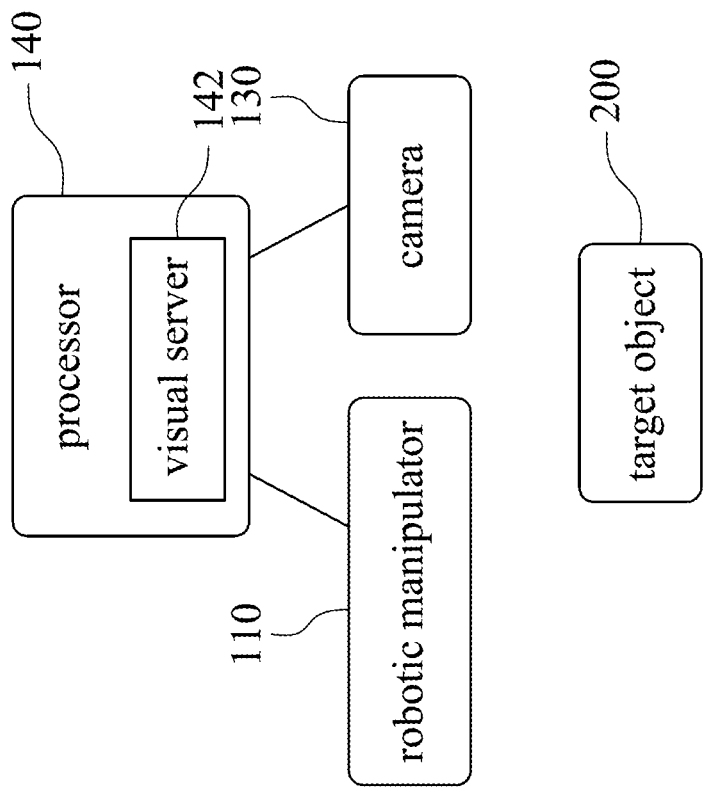
FIG. 2 shows a block view of the robot according to the embodiment in FIG. 1.
Figure 3:
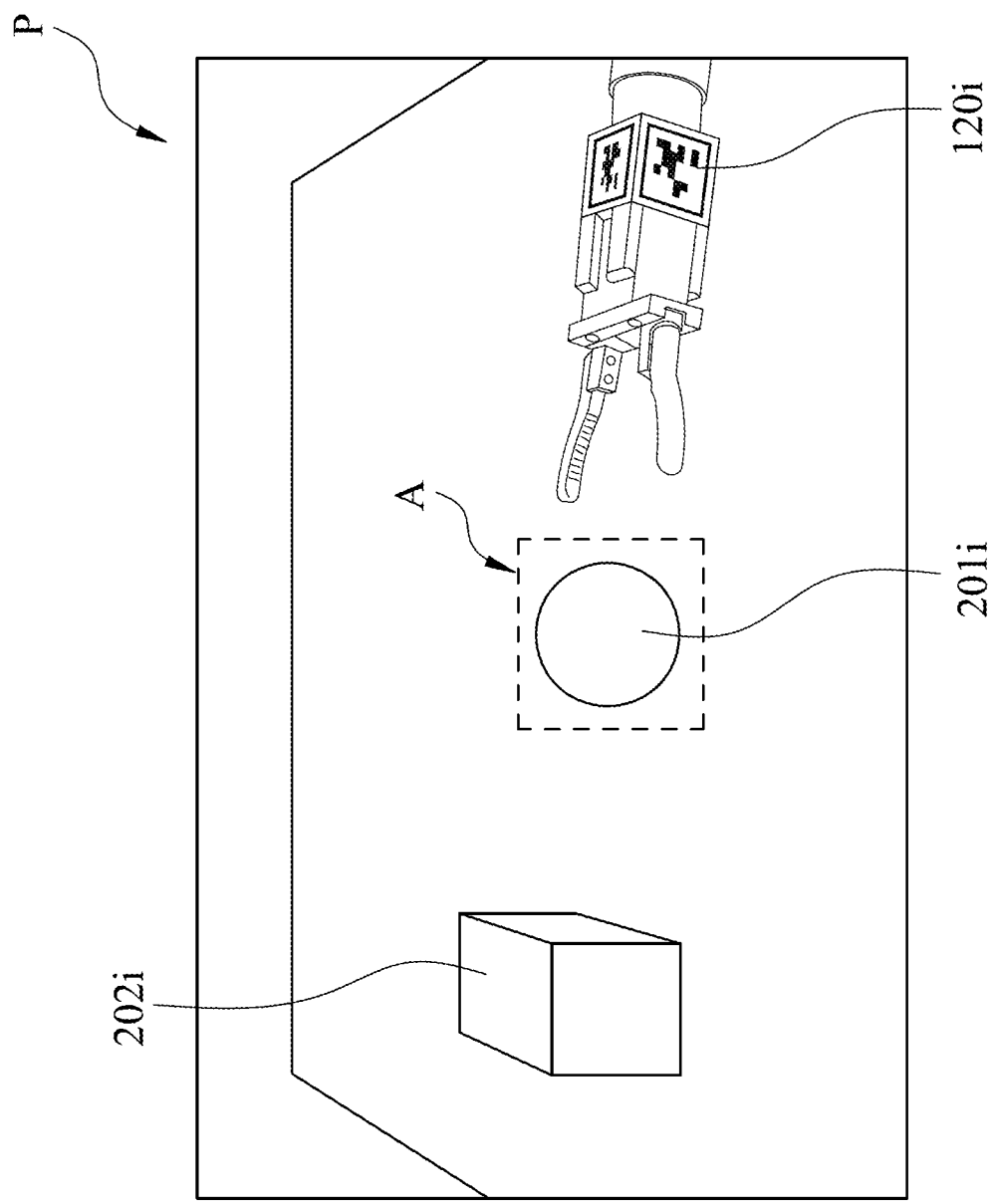
FIG. 3 shows a picture of a camera of the robot according to the embodiment in FIG. 1.

FIG. 1 shows a three-dimensional view of a robot 100 according to an embodiment of the present disclosure and a schematic view of a working space 300 and a target object 200. FIG. 2 shows a block view of the robot 100 according to the embodiment in FIG. 1. FIG. 3 shows a picture P of a camera 130 of the robot 100 according to the embodiment in FIG. 1. As shown in FIGS. 1 and 2, the robot 100 includes a robotic manipulator 110, a calibrating image 120, a camera 130 and a processor 140. The robot 100 is for interacting with the target object 200 (i.e., the two target objects 201, 202 in FIG. 1) in the working space 300, and, for example, the robotic manipulator 110 can be executed for gripping, processing, or assembling the target object 201 or the target object 202, but the present disclosure is not limited thereto. The working space 300 can be a space such as a warehousing space, a production station, a working bench, etc., but the present disclosure is not limited thereto. The target objects 201, 202 can be objects such as warehousing objects, workpieces, hand tools, etc., but the present disclosure is not limited thereto. In FIG. 1, the working space 300 is illustrated as a working bench and the space thereupon, and the target object 201 is illustrated as a ball, and the target object 202 is illustrated as a cube; however, in other embodiments, a number of the target object can be one or more than two, and each of the target objects can be the same or different objects. In FIG. 1, the target objects 201, 202 are placed on the working bench as an example, but in other embodiments, the target objects can be dangled or not stay in still state such as moving up, down, to right or to left relatively to the working space.

In the embodiment of FIG. 1, the robotic manipulator 110 and the camera 130 are disposed at a body frame 150 of the robot 100, and the robot 100 includes the two robotic manipulators 110 so that the robot 100 is presented as a humanoid robot, but the present disclosure is not limited thereto. The camera 130 of the robot 100 is for shooting the target objects 201, 202 and generating the picture P. In FIG. 3, all of the target objects 201, 202 and the calibrating image 120 are located at the shooting region of the camera 130 at the same time, and thus an image 201i of the target object 201, an image 202i of the target object 202 and an image 120i of the calibrating image 120 are located in the picture P at the same time. The picture P shown in FIG. 3 is a scene shot by the camera 130 at a time point; however, in each time points during the hand-eye calibrating process, the shooting region of the camera 130 can only include one or two of the target objects 201, 202 and the calibrating image 120, or even none of the target objects 201, 202 and the calibrating image 120 is in the shooting region of the camera 130. The processor 140 is electrically connected to the robotic manipulator 110 and the camera 130 and configured to move the robotic manipulator 110.

In the working space 300, the robotic manipulator 110 and the camera 130 correspond to different coordinates. The robotic manipulator 110 corresponds to a robotic manipulator coordinate {T}, and the camera 130 corresponds to a camera coordinate {C}. The configuration of the calibrating image 120 is for calibrating transforming relation between the robotic manipulator coordinate {T} and the camera coordinate {C} to move the robotic manipulator 110 to the position of the target object 201 or the target object 202 detected by the camera 130 (i.e., the coordinate in the camera coordinate {C} corresponding to the target object 201 or the target object 202) to interact with the target object 201 or the target object 202.

In the embodiment, the calibrating image 120 is disposed on the robotic manipulator 110. Hence, during the hand-eye calibration, the processor 140 controls the robotic manipulator 110 to move towards the target object 200 such that the calibrating image 120 moves towards the target object 200 and enters the picture P. For example, when the robotic manipulator 110 is going to grab the target object 201, the processor 140 controls the robotic manipulator 110 to move towards the target object 201 such that the calibrating image 120 moves towards the target object 200 and enters the picture P. The processor 140 records robotic manipulator coordinate datasets and camera coordinate datasets of the calibrating image 120 as the calibrating image 120 moving towards the target object 201, and the processor 140 uses the robotic manipulator coordinate datasets and the camera coordinate datasets to execute a hand-eye calibrating algorithm to obtain a calibrated mapping between the camera coordinate {C} and the robotic manipulator coordinate {T}. By disposing the calibrating image 120 on the robotic manipulator 110, the space occupied by the hand-eye calibration of the robot 100 can be reduced, and steps of disposing and removing a calibration plate are not necessary, and the function of calibration in any time and any place to improve immediacy of calibration is achieved. Since a path can be generated automatically by the robot 100 as the calibrating image 120 moving towards the target object 201, the time of adjusting the postures of the robotic manipulator 110 manually to collect datasets can be reduced. Thus, with the processor 140 recording the robotic manipulator coordinate datasets and the camera coordinate datasets of the calibrating image 120 as the calibrating image 120 moving towards the target object 201 and using the robotic manipulator coordinate datasets and the camera coordinate datasets to execute the hand-eye calibrating algorithm, the required time of the robot 100 for operating the hand-eye calibration can be reduced.

In detail, the processor 140 can include a visual server 142, and the processor 140 is configured to control the camera 130 to rotate. During operating the hand-eye calibration, the processor 140 controls the camera 130 to rotate and to look around the working space 300 where the target objects 201, 202 are located such that the calibrating image 120 and the target objects 201, 202 enter the picture in turns (the picture P at a time point during rotation of the camera 130 is illustrated exemplarily in FIG. 3), the visual server 142 positions and records a calibrating image angle of the calibrating image 120 in the working space 300 and a target object angle of each of the target objects 201, 202 in the working space 300 according to the picture. The definition of the calibrating image angle can be for example an angle rotated by the camera 130 from an initial state to a state that allows the image 120i of the calibrating image 120 to be located at a central region A of the picture. For example, the central region A can be defined as a region covered by pixels within a specific range close to a center of the picture. The definition of the target object angle is similar with the definition of the calibrating image angle. After the processor 140 records the angles of the concerned objects, the processor 140 controls the camera 130 to rotate and look at the calibrating image 120 according to the calibrating image angle and controls the camera 130 to rotate towards the target object angle, and the visual server 142 controls the robotic manipulator 110 to move according to a direction that the camera 130 rotates such that the calibrating image 120 retains in the picture.

For example, when the robotic manipulator 110 is going to grab the target object 201, the processor 140 controls the camera 130 to rotate and look at the calibrating image 120 according to the calibrating image angle first, controls the camera 130 to rotate towards the target object angle of the target object 201, and then the visual server 142 controls the robotic manipulator 110 to move according to a direction that the camera 130 rotates such that the calibrating image 120 retains in the picture. Through the process of the camera 130 looking towards the calibrating image 120 and the robotic manipulator 110 moving towards the target object 201, the more precise calibrating result can be achieved. In other embodiments, without looking towards the calibrating image first, the camera can look towards the target object, and the visual server controls the robotic manipulator to allow the calibrating image to enter the picture, but the present disclosure is not limited thereto.

Whichever the hand-eye calibration executed before operating procedure, or the hand-eye calibration required in the following procedure (for example, the interacting target of the robotic manipulator 110 is transformed from the target object 201 to the target object 202, or the error caused by shifting of each part of the robot 100), the path of the robotic manipulator 110 and the calibrating image 120 moving towards the target object 201 or the target object 202 can be directly and automatically generated by the visual server 142 to record the robotic manipulator coordinate datasets and the camera coordinate datasets, and the hand-eye calibrating algorithm can be executed without placing the calibration plate. The robot 100 just needs to rotate the camera 130 and move the robotic manipulator 110 such that the calibrating image 120 and the target object 200 with which the robotic manipulator 110 is going to be interacted enter the shooting region of the camera 130, and then the calibration can be executed. After the calibration finished, the robotic manipulator 110 has been located nearby the target object 200 with which the robotic manipulator 110 is going be interacted, and the tasks can be operated directly. The aforementioned procedure can be automated completely and can be added in any operating procedure of the robot 100. Compared with the conventional art with placing the calibration plate manually, the required time of calibration can be reduced.

During hand-eye calibration, the accuracy of the calibrated mapping between the camera coordinate {C} and the robotic manipulator coordinate {T} can be affected by the error of the camera 130, absolute accuracy of the robotic manipulator 110 and the calculating accuracy of the algorithm. Because the picture shot by the general camera is accurate at center and distorted around peripheral, the visual server 142 can be configured to determine whether the target object with which the robotic manipulator 110 is interacted (for example, the target object 201) at the central region A of the picture to obtain the more precise result of calibration; if the target object 201 is at the central region A of the picture, the processor 140 controls the robotic manipulator 110 to move such that the calibrating image 120 moves towards the target object 201, and the processor 140 records the robotic manipulator coordinate datasets and the camera coordinate datasets as the calibrating image 120 moving towards the target object 201; if the target object 201 is not at a central region A of the picture, the visual server 142 keeps controlling the robotic manipulator 110 to move such that the calibrating image retains in the picture. Hence, by controlling the target object 201 and the calibrating image 120 at the center of the shooting region of the camera 130, the error caused by the camera 130 can be reduced, the affection of calibration of the absolute accuracy of the robotic manipulator 110 can also be reduced, and then the more precise accuracy of hand-eye calibration can be achieved.

Moreover, the processor 140 can be configured to set a distance threshold according to a size of the target object 200 with which the robotic manipulator 110 is interacted, and the processor 140 determines whether the calibrating image 120 is close to the target object 200 with which the robotic manipulator 110 is interacted according to the distance threshold. If the calibrating image 120 is close to the target object 200 with which the robotic manipulator 110 is interacted, the processor 140 uses the robotic manipulator coordinate datasets and the camera coordinate datasets to execute the hand-eye calibrating algorithm to obtain the calibrated mapping between the camera coordinate {C} and the robotic manipulator coordinate {T}. For example, as the calibrating image 120 moves towards the target object 201, the processor 140 can calculate the distance between the calibrating image 120 and the target object 201 according to the picture of the camera 130 and determine whether the distance between the calibrating image 120 and the target object 201 is larger than the distance threshold; if the distance between the calibrating image 120 and the target object 201 is larger than the distance threshold, the processor 140 keeps controlling the calibrating image 120 moving towards the target object 201; if the distance between the calibrating image 120 and the target object 201 is smaller than or equal to the distance threshold, the processor 140 uses the robotic manipulator coordinate datasets and the camera coordinate datasets to execute the hand-eye calibrating algorithm to obtain the calibrated mapping between the camera coordinate {C} and the robotic manipulator coordinate {T}. Because hand-eye calibration needs to be executed nearby the target object 200 to obtain the more precise accuracy, the smaller size of the target object 200 is, the more precise calibration of the robotic manipulator 110 is required. With the processor 140 setting the distance threshold according to the size of the target object 200 and determining whether the calibrated image 120 is close to the target object 200 according to the distance threshold, and with controlling the robotic manipulator 110 close to the target object 200, the affection on the result of the hand-eye calibration caused by an absolute error of the robotic manipulator 110 can be reduced to improve the accuracy of the hand-eye calibration.

The hand-eye calibrating algorithm used in the present embodiment can be algorithms such as vector quantization approach, dual-quaternions, closed form solution, iterative method, iterative dual quaternion method, particle swarm optimization, Levenberg-Marquardt algorithm, adaptive artificial network based fuzzy interference system (ANFIS), singular value decomposition, quaternions, etc. and combinations thereof. The image recognition of the calibrating image 120 and the target objects 201, 202, and the movement of the calibrating image 120 retaining in the picture during the moving process by controlling the robotic manipulator 110 and the camera 130 can be achieved by the conventional art of the visual server, and, recording of the robotic manipulator coordinate datasets and the camera coordinate datasets as the calibrating image 120 moving towards the target object 201 can be achieved by the conventional art, which are not major features of the present disclosure and will not be described herein.

Please refer to FIG. 1. The robotic manipulator 110 of the present disclosure can be a serial manipulator such as a five-axis robotic manipulator, a six-axis robotic manipulator, a seven-axis robotic manipulator, etc., but the present disclosure is not limited thereto. In the embodiment of FIG. 1, the robotic manipulator 110 includes a flange adapter 112, an end-effector 114, a forearm 116, an upper arm 117, a posterior arm 118 and a rotating arm 119. The flange adapter 112 is connected between the end-effector 114 and the forearm 116, and the calibrating image 120 is disposed on a surface of the flange adapter 112. In other embodiments of the present disclosure which are not shown, the flange adapter can be connected between the forearm and the upper arm, between the upper arm and the posterior arm, or between the posterior arm and the rotating arm, and the calibrating image is disposed on the flange adapter. Alternatively, the calibrating image can be disposed on the robotic manipulator by printing, adhesive, etc., without the flange adapter. Because the movement of the robotic manipulator 110 is conventional and not a major feature of the present disclosure, it will not be described herein.

Figure 4:
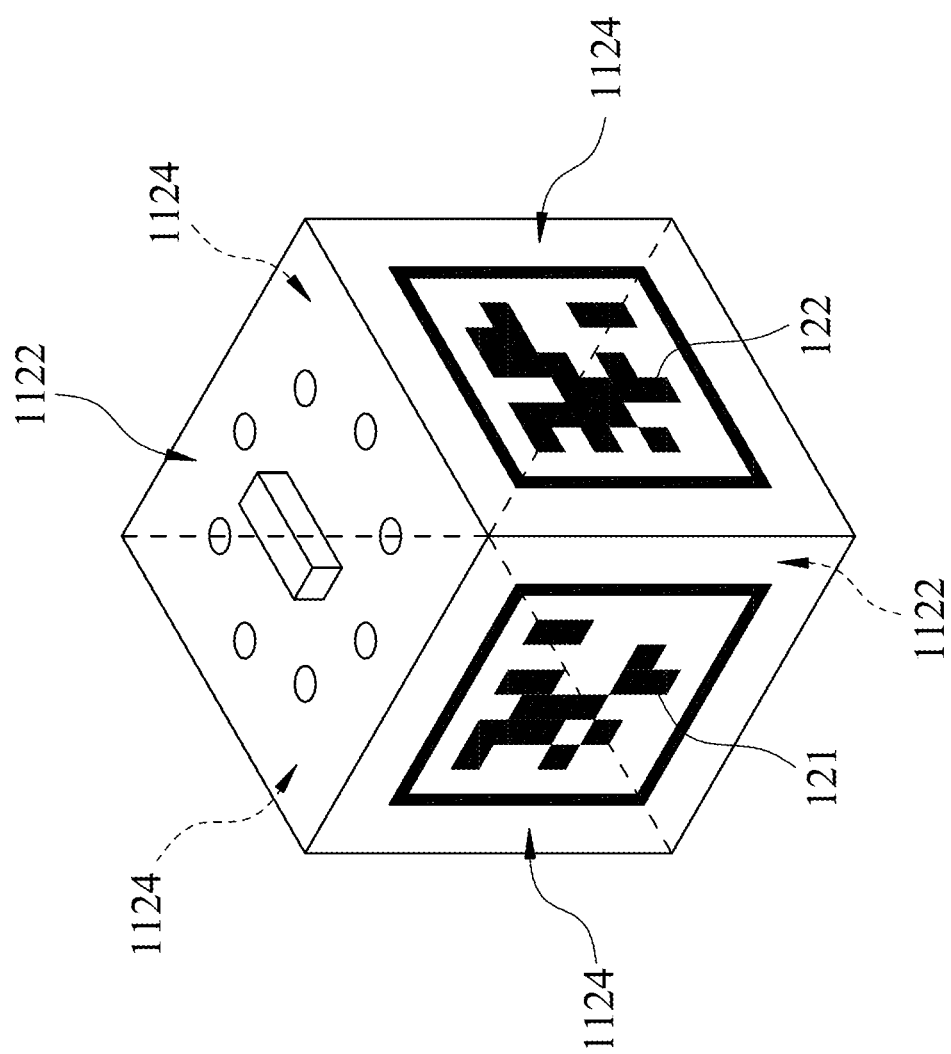
FIG. 4 shows a schematic view of the flange adapter according to the embodiment in FIG. 1.

Please refer to FIG. 4. The following is going to describe the details of the flange adapter 112 and the calibrating image 120 of the embodiment. FIG. 4 shows a schematic view of the flange adapter 112 according to the embodiment in FIG. 1. As shown in FIG. 4, the flange adapter 112 is in a shape of a hexahedron which includes two opposite installing surfaces 1122 and four faces 1124 connecting the two installing surfaces 1122. The two installing surface 1122 are configured to install the end-effector 114 and the forearm 116, respectively. The calibrating image 120 is disposed at the four faces 1124. In the present embodiment, the calibrating image 120 includes four calibrating patterns, and the four calibrating patterns are disposed at the four faces 1124, respectively. The four calibrating patterns are two calibrating patterns 121, 122 and two calibrating patterns not shown because of blocking by the two faces 1124. The calibrating patterns 121, 122 are directional two-dimensional patterns such as two-dimensional patterns selected from AprilTag, but the present disclosure is not limited thereto. Although the flange adapter 112 of the present embodiment is in the shape of the hexahedron with four faces 1124 placing the calibrating image 120, in other embodiments of the present disclosure which are not shown, the flange adapter can be in shapes of other forms such as a polyhedron having three, five, six, and a plurality of faces, or a polyhedron being ring-shaped, irregular-shaped, etc. With configuring the flange adapter 112 as a solid polyhedron structure and disposing the calibrating patterns 121, 122 at the flange adapter 112, the calibrating patterns 121, 122 can be covered hardly during moving the robotic manipulator 110 to improve success rate of the hand-eye calibration.

Figure 5:
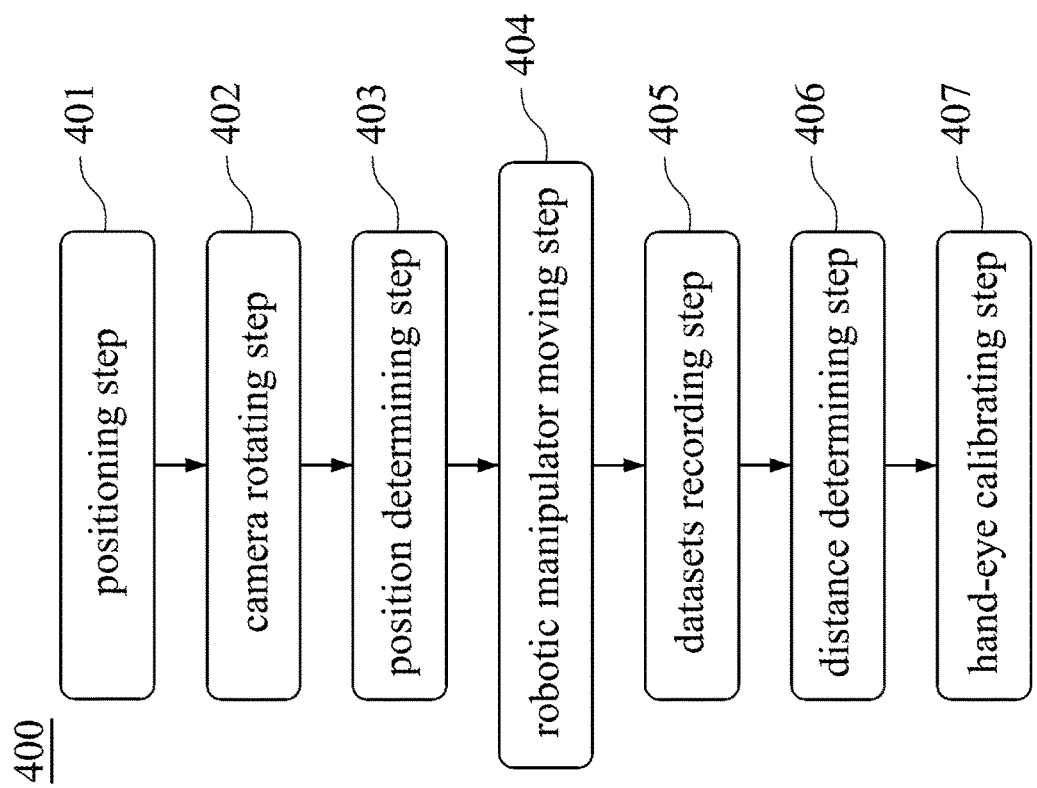
FIG. 5 shows a block diagram of a robot hand-eye calibrating method according to another embodiment of the present disclosure.
Figure 6:
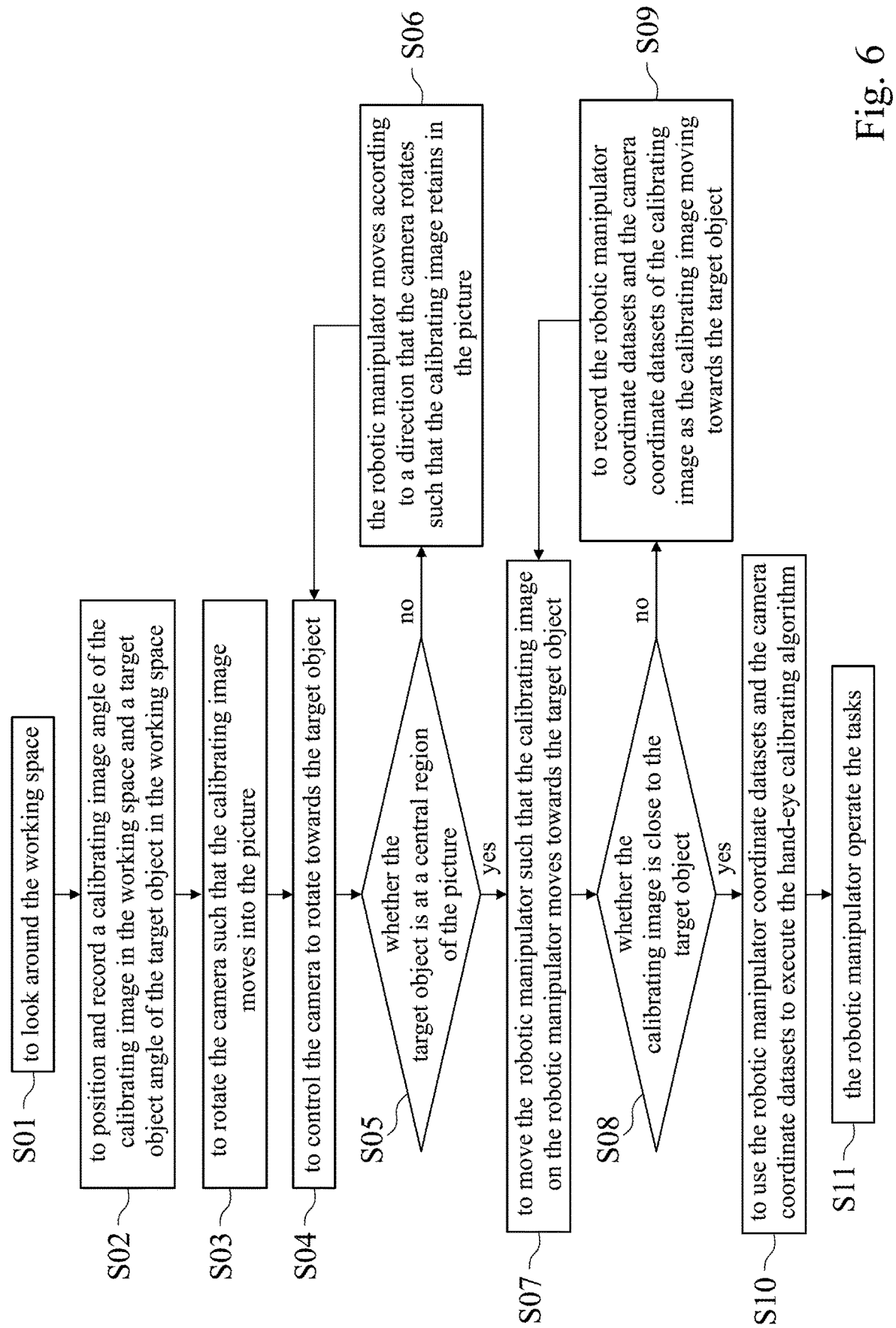
FIG. 6 shows a step flow of the robot hand-eye calibrating method according to the embodiment in FIG. 5.

Please refer to FIGS. 1 to 3, 5 and 6. FIG. 5 shows a block diagram of a robot hand-eye calibrating method 400 according to another embodiment of the present disclosure. FIG. 6 shows a step flow of the robot hand-eye calibrating method 400 according to the embodiment in FIG. 5. As shown in FIGS. 5 and 6, the robot hand-eye calibrating method 400 includes a positioning step 401, a camera rotating step 402, a position determining step 403, a robotic manipulator moving step 404, a datasets recording step 405, a distance determining step 406 and a hand-eye calibrating step 407. In details, the steps of the robot hand-eye calibrating method 400 include steps S01 to S11.

The positioning step 401 can include the steps S01 and S02. In the step S01, the camera 130 looks around the working space 300 where the target objects 201, 202 are located such that the calibrating image 120 and the target objects 201, 202 enter the picture. In the step S02, the processor 140 positions and records the calibrating image angle of the calibrating image 120 in the working space 300 and the target object angles of the target objects 201, 202 in the working space 300 according to the picture.

The camera rotating step 402 can include the steps S03, S04 and S06. In the step S04, the camera 130 is rotated such that the target object 200 enters the picture of the camera 130, and the camera 130 corresponds to the camera coordinate $\{C\}$. For example, if the interacted object is the target object 201, the camera 130 is rotated such that the target object 201 enters the picture of the camera 130. To achieve the more precise result of hand-eye calibration, the step S03 can be performed before the step S04 to control the camera 130 to rotate according to the calibrating image angle such that the calibrating image 120 moves into the picture, after which the steps S04 and S06 are performed at the same time to control the camera 130 to rotate towards the target object angle and the robotic manipulator 110 to move according to the direction that the camera 130 rotates such that the calibrating image 120 retains in the picture. Therefore, during rotating the camera 130 to allow the target object 201 to enter the picture of the camera 130, the calibrating image 120 can keep being located in the picture to improve the accuracy of hand-eye calibration.

The position determining step 403 includes the step S05. The processor 140 determines whether the target object 201 is at the central region A of the picture; if the target object 201 is at the central region A of the picture, the robotic manipulator moving step 404 is then executed; if the target object 201 is not at the central region A of the picture, the steps S04 and S06 of the camera rotating step 402 is continued.

The robotic manipulator moving step 404 includes the step S07. The processor 140 controls the robotic manipulator 110 to move such that the calibrating image 120 on the robotic manipulator 110 moves towards the target object 201, and the robotic manipulator 110 corresponds to the robotic manipulator coordinate $\{T\}$.

The datasets recording step 405 includes the step S09. The processor 140 records the robotic manipulator coordinate datasets and the camera coordinate datasets of the calibrating image 120 as the calibrating image 120 moving towards the target object 201. It is noticed that in the step S07, the robotic manipulator coordinate datasets and the camera coordinate datasets during moving are recorded in any time.

The distance determining step 406 includes the step S08. The processor 140 determines whether the calibrating image 120 is close to the target object 201; if the calibrating image 120 is close to the target object 201, the hand-eye calibrating step 407 is then executed; if the calibrating image 120 is not close to the target object 201, the datasets recording step 405 is continued.

The hand-eye calibrating step 407 includes the step S10. The processor 140 uses the robotic manipulator coordinate datasets and camera coordinate datasets to execute the hand-eye calibrating algorithm to obtain the calibrated mapping between the camera coordinate $\{C\}$ and the robotic manipulator coordinate $\{T\}$. After, the step S11 is then executed such that the robotic manipulator 110 starts to operate the tasks such as gripping, processing, assembling, etc.

In the robot hand-eye calibrating method 400, by placing the calibrating image 120 on the robotic manipulator 110 such that the calibrating image 120 moves as the robotic manipulator 110 moves, and the calibrating procedure can be executed immediately if calibration is required again to achieve the function of calibration in any place and any time. Moreover, by placing the calibrating image 120 on the robotic manipulator 110 such that the calibrating image 120 is followed as the camera 130 moves, the calibrating image 120 and the target object 200 can retain nearby the central region A of the picture during collecting datasets such that the errors of the robotic manipulator 110 and the camera 130 can be minimized to reduce the procedures of correcting the error of each of the robotic manipulator and the camera individually. Moreover, by placing the visual server 142, the robot 100 can generate a calibrating path independently and collect a plurality of datasets for the calculation of the hand-eye calibrating algorithm. When the hand-eye calibration is finished, the robotic manipulator 110 has been nearby the target object 200 already and then the following tasks of the robotic manipulator 110 can be executed directly to improve efficiency of hand-eye calibration.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A robot for interacting with a target object, comprising:
    a robotic manipulator corresponding to a robotic manipulator coordinate;
    a calibrating image disposed on the robotic manipulator;
    a camera corresponding to a camera coordinate and for shooting the target object and generating a picture; and
    a processor configured to move the robotic manipulator such that the calibrating image moves towards the target object and enters the picture, and the processor recording robotic manipulator coordinate datasets and camera coordinate datasets of the calibrating image as the calibrating image moving towards the target object, and using the robotic manipulator coordinate datasets and the camera coordinate datasets to execute a hand-eye calibrating algorithm to obtain a calibrated mapping between the camera coordinate and the robotic manipulator coordinate;
    wherein the processor is configured to set a distance threshold according to a size of the target object, and the processor determines whether the calibrating image is close to the target object according to the distance threshold, if the calibrating image is close to the target object, the processor uses the robotic manipulator coordinate datasets and the camera coordinate datasets to execute the hand-eye calibrating algorithm to obtain the calibrated mapping between the camera coordinate and the robotic manipulator coordinate.

2. The robot of claim 1, wherein the processor further comprises a visual server, wherein the processor is configured to control the camera to rotate and to look around a working space where the target object is located such that the calibrating image and the target object enter the picture, the visual server positions and records a calibrating image angle of the calibrating image in the working space and a target object angle of the target object in the working space according to the picture, the processor controls the camera to rotate and to look at the calibrating image according to the calibrating image angle, and controls the camera to rotate towards the target object, and the visual server controls the robotic manipulator to move according to a direction that the camera rotates such that the calibrating image retains in the picture.

3. The robot of claim 2, wherein the visual server is configured to determine whether the target object is at a central region of the picture; if the target object is at the central region of the picture, the processor controls the robotic manipulator to move such that the calibrating image moves towards the target object; if the target object is not at a central region of the picture, the visual server keeps controlling the robotic manipulator to move such that the calibrating image retains in the picture.

4. The robot of claim 1, wherein the robotic manipulator comprises a flange adapter, and the calibrating image is disposed at a surface of the flange adapter.

5. The robot of claim 4, wherein the calibrating image comprises four calibrating patterns disposed at four faces of the flange adapter, and each of the calibrating patterns has directivity.

6. A robot hand-eye calibrating method, comprising:
    a camera rotating step is performed, wherein a processor rotates a camera such that a target object enters a picture of the camera, wherein the camera corresponds to a camera coordinate;
    a robotic manipulator moving step, wherein the processor moves a robotic manipulator such that a calibrating image on the robotic manipulator moves towards a target object, wherein the robotic manipulator corresponds to a robotic manipulator coordinate;
    a datasets recording step, wherein the processor records robotic manipulator coordinate datasets and camera coordinate datasets of the calibrating image as the calibrating image moving towards the target object;
    a hand-eye calibrating step, wherein the processor uses the robotic manipulator coordinate datasets and the camera coordinate datasets to execute a hand-eye calibrating algorithm to obtain a calibrated mapping between the camera coordinate and the robotic manipulator coordinate; and
    a distance determining step, wherein the processor determines whether the calibrating image is close to the target object according to a distance threshold, and if the calibrating image is close to the target object, the hand-eye calibrating step is then executed; if the calibrating image is not close to the target object, the datasets recording step is continued.

7. The robot hand-eye calibrating method of claim 6, further comprising:
    a positioning step, wherein the processor controls the camera to look around a working space where the target object is located such that the calibrating image and the target object enter the picture, and positions and records a calibrating image angle of the calibrating image in the working space and a target object angle of the target object in the working space according to the picture;
    wherein in the camera rotating step, the camera rotates according to the calibrating image angle such that the calibrating image moves into the picture, the camera rotates towards the target object, and a visual server controls the robotic manipulator to move according to a direction that the camera rotates such that the calibrating image retains in the picture.

8. The robot hand-eye calibrating method of claim 7, further comprising:
    a position determining step, wherein the processor determines whether the target object is at a central region of the picture, and if the target object is at the central region of the picture, the robotic manipulator moving step is then executed; if the target object is not at the central region of the picture, the camera rotating step is continued.

9. The robot hand-eye calibrating method of claim 6, wherein the robotic manipulator comprises a flange adapter, and the calibrating image is disposed on the flange adapter.

* * * * *